(12) United States Patent
Okamura

(10) Patent No.: US 11,704,651 B2
(45) Date of Patent: Jul. 18, 2023

(54) FRAUD BEHAVIOR RECOGNITION DEVICE, CONTROL PROGRAM THEREOF, AND FRAUD BEHAVIOR RECOGNITION METHOD

(71) Applicant: TOSHIBA TEC KABUSHIKI KAISHA, Tokyo (JP)

(72) Inventor: Atsushi Okamura, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/528,064

(22) Filed: Nov. 16, 2021

(65) Prior Publication Data
US 2022/0222644 A1    Jul. 14, 2022

(30) Foreign Application Priority Data
Jan. 14, 2021    (JP) .................................. 2021-004259

(51) Int. Cl.
*G06Q 20/20*    (2012.01)
*G06V 40/20*    (2022.01)

(52) U.S. Cl.
CPC ......... *G06Q 20/206* (2013.01); *G06Q 20/202* (2013.01); *G06V 40/20* (2022.01)

(58) Field of Classification Search
CPC ..... G06Q 20/206; G06Q 20/202; G06V 40/20
See application file for complete search history.

(56) References Cited

U.S. PATENT DOCUMENTS

| 10,726,682 | B2 | 7/2020 | Takeno |
| 2008/0218591 | A1* | 9/2008 | Heier ....................... G07G 1/14 348/E7.091 |
| 2011/0087535 | A1* | 4/2011 | Yoshizawa ............. G06Q 20/20 705/16 |
| 2012/0169879 | A1 | 7/2012 | Libal et al. |
| 2014/0176719 | A1 | 6/2014 | Migdal et al. |

(Continued)

FOREIGN PATENT DOCUMENTS

WO    2020/045196 A1    3/2020

OTHER PUBLICATIONS

Extended European Search Report dated Jun. 1, 2022, in corresponding European Patent Application No. 21214482.8, 11 pages.

*Primary Examiner* — A. Hunter Wilder
*Assistant Examiner* — Joseph M Mutschler
(74) *Attorney, Agent, or Firm* — Kim & Stewart LLP

(57) ABSTRACT

A detection device for detecting a fraud behavior of a customer at a point-of-sale (POS) terminal in a store, including a first interface circuit configured to receive a first image of the customer from a camera, a second interface circuit configured to receive a second image that is displayed on the POS terminal, and a processor configured to acquire one or more first images via the first interface circuit and determine one or more behaviors of the customer based on the acquired first images, acquire one or more second images via the second interface circuit and determine, based on the acquired second images, one or more operations that have been made by the customer on the POS terminal, and determine that one of the behaviors is fraudulent based on one or more of the operations that have been made by the customer before said one of the behaviors.

16 Claims, 12 Drawing Sheets

(56) References Cited

U.S. PATENT DOCUMENTS

2015/0193780 A1* 7/2015 Migdal ............... G06Q 30/018
    705/317
2021/0192486 A1  6/2021 Uchimura et al.

* cited by examiner

FIG. 3

| | 71 | 72 | SC |
|---|---|---|---|
| | CASHIER NO. 001 | REGISTERING | |

73 — ERROR INFORMATION
[          ]

74 — DECLARATION INFORMATION
[ BAG NOT REQUIRED ]

75 —
| MERCHANDISE NAME | NUMBER OF ITEMS | PRICE |
|---|---|---|
| AAAAA | 1 ITEM | 100 YEN |
| BBBBB | 1 ITEM | 150 YEN |
| CCCCC | 1 ITEM | 250 YEN |

76 —
| | |
|---|---|
| TOTAL NUMBER OF ITEMS | 3 ITEMS |
| TOTAL PRICE | 500 YEN |
| PAID AMOUNT | |
| CHANGE | |

FIG. 5

| EC | MESSAGE | 821 |
|---|---|---|
| 91 | UNAUTHORIZED TAKING-OUT HAS BEEN PERFORMED AT CASHIER NO. X | |
| 92 | FAKE REGISTRATION HAS BEEN PERFORMED AT CASHIER NO. X | |
| 93 | FALSE CANCELLATION HAS BEEN PERFORMED AT CASHIER NO. X | |
| 94 | REGISTRATION HAS BEEN OMITTED AT CASHIER NO. X | |
| 95 | SETTLEMENT HAS NOT BEEN COMPLETED AT CASHIER NO. X | |

FIG. 6

| CASHIER NO. | 001 | 822 |
|---|---|---|
| TIME TM | STorEC | |
| | | |
| | | |
| | | |
| | | |
| ⋮ | ⋮ | |

FRAUD BEHAVIOR RECOGNITION DEVICE, CONTROL PROGRAM THEREOF, AND FRAUD BEHAVIOR RECOGNITION METHOD

CROSS-REFERENCE TO RELATED APPLICATION

This application is based upon and claims the benefit of priority from Japanese Patent Application No. 2021-004259, filed Jan. 14, 2021, the entire contents of which are incorporated herein by reference.

FIELD

Embodiment disclosed herein relate generally to a fraud detection devices, methods performed by a fraud detection device, and point-of-sale (POS) systems incorporating fraud detection devices and methods for retail store operations.

BACKGROUND

In recent years, at retail stores such as supermarkets, in view of reducing labor costs and preventing transmission of infectious diseases, self-service POS terminals have been increasingly introduced. The self-service POS terminals incorporate a payment processing functions so a customer can both perform registration of purchased items and then settlement (payment) by himself or herself. Because there is less oversight and interaction with store employees for such customers, additional technologies for detecting and suppressing fraudulent activities (e.g., theft or improper registration of merchandise) by customers are required.

BRIEF DESCRIPTION OF DRAWINGS

FIG. 3 is a schematic diagram illustrating an example of a monitoring screen displayed on a display of an attendant terminal.

FIG. 5 is a schematic diagram illustrating a data structure of a message table.

FIG. 6 is a schematic diagram illustrating a data structure of a time-series buffer.

DETAILED DESCRIPTION

In general, according to one embodiment, a fraud behavior recognition device and a method thereof are provided for detecting and suppressing fraud behaviors of customers on full-self-service-based payment terminals.

According to one embodiment, a detection device for detecting a fraud behavior of a customer at a point-of-sale (POS) terminal in a store, includes a first interface circuit configured to receive a first image of the customer from a camera, a second interface circuit configured to receive a second image that is displayed on the POS terminal, and a processor configured to acquire one or more first images via the first interface circuit and determine one or more behaviors of the customer based on the acquired first images, acquire one or more second images via the second interface circuit and determine, based on the acquired second images, one or more operations that have been made by the customer on the POS terminal, and determine that one of the behaviors is fraudulent based on one or more of the operations that have been made by the customer before said one of the behaviors.

Hereinafter, embodiments are described with reference to the drawings.

Figure 1:
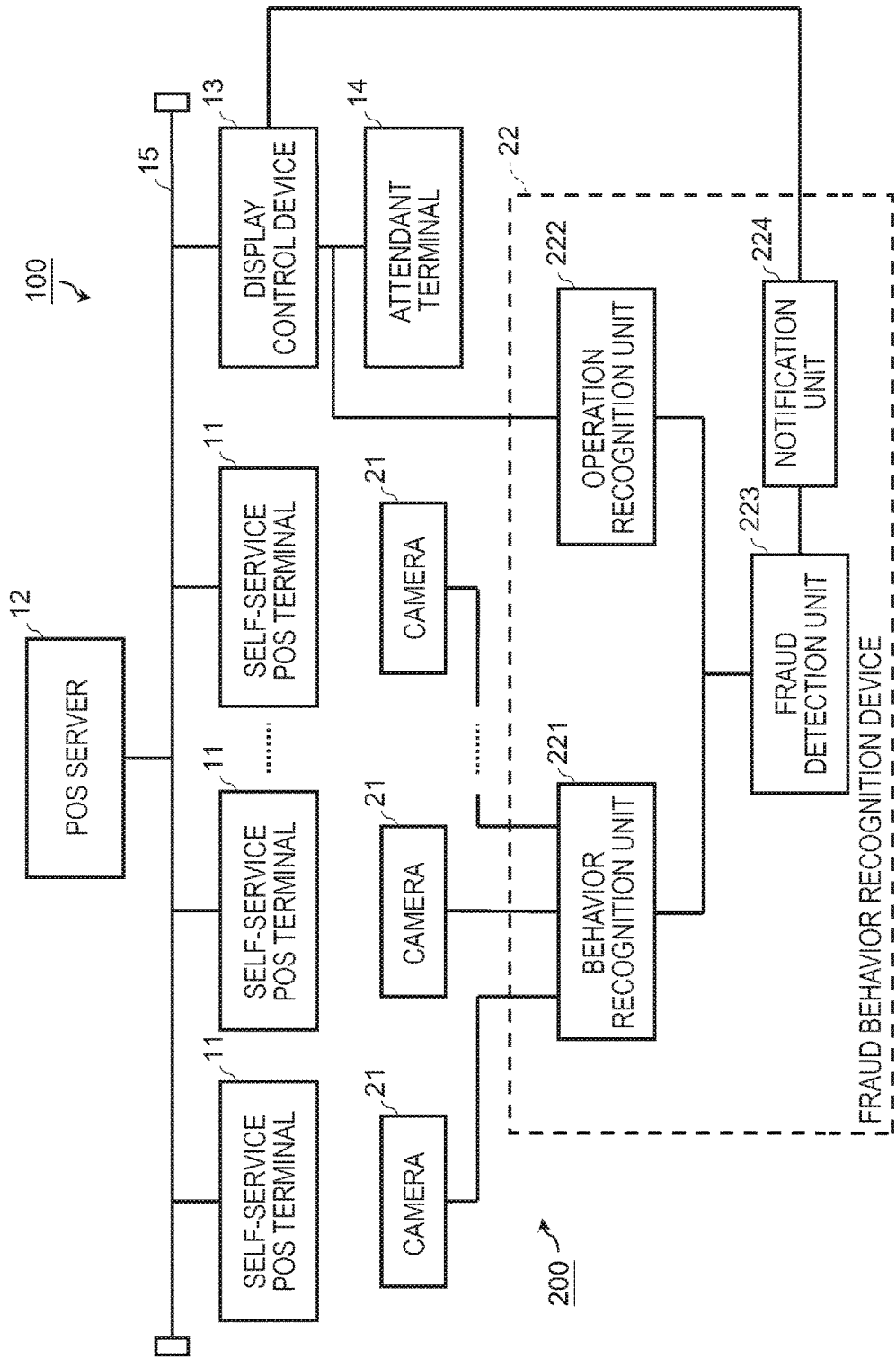
FIG. 1 is a diagram of a system including self-service POS terminals installed in a store.

FIG. 1 is a diagram of a system including a plurality of self-service POS terminals 11 installed in a store. The present system includes a self-service POS system 100 and a fraud behavior recognition system 200. The self-service POS system 100 includes the plurality of self-service POS terminals 11, a POS server 12, a display control device 13, an attendant terminal 14, and a communication network 15. The plurality of self-service POS terminals 11, the POS server 12, and the display control device 13 are connected to the communication network 15. The attendant terminal 14 is connected to the display control device 13. The communication network 15 is typically a Local Area Network (LAN). The LAN may be a wired LAN or a wireless LAN.

The self-service POS terminal 11 is a payment terminal with which a customer can perform registration of purchased merchandise and settlement thereof by himself or herself. The customer may be called a buyer, a consumer, or a client in this disclosure. The POS server 12 is a server computer for centrally controlling an operation of each self-service POS terminal 11. The display control device 13 is a controller that generates a monitoring screen SC (see FIG. 3) for each self-service POS terminal 11 based on a data signal output from each self-service POS terminal 11 and causes the screen to be displayed on a display device of the attendant terminal 14. The attendant terminal 14 is a terminal that enables a clerk called an attendant to monitor a state of each self-service POS terminal 11. The attendant terminal 14 includes the display device such as a liquid crystal display and an organic EL display. The attendant terminal 14 divides a display area of the display device into a plurality of areas for displaying different monitoring screens SC. As the self-service POS system 100, any system known in the related art can be applied as it is.

The fraud behavior recognition system 200 includes a plurality of cameras 21 and a fraud behavior recognition device 22. Each of the plurality of cameras 21 corresponds to a corresponding one of the plurality of self-service POS terminals 11. Each camera 21 photographs a customer who is operating the corresponding self-service POS terminal 11.

The fraud behavior recognition device 22 performs functions of a behavior recognition unit 221, an operation recognition unit 222, a fraud detection unit 223, and a notification unit 224. The behavior recognition unit 221 has a function of recognizing a behavior of a customer operating each of the self-service POS terminals 11 based on imaged data output from the corresponding camera 21.

The operation recognition unit 222 has a function of recognizing an operation of the customer operating each self-service POS terminal 11 based on data of the monitoring screen SC output from the display control device 13 to the attendant terminal 14.

The fraud detection unit 223 has a function of detecting a fraud behavior of the customer operating each self-service POS terminal 11 based on a recognition result by the behavior recognition unit 221 and a recognition result by the operation recognition unit 222.

The notification unit 224 has a notification function when the fraud behavior is detected by the fraud detection unit 223. The notification is transmitted to, for example, the attendant terminal 14.

Figure 2:
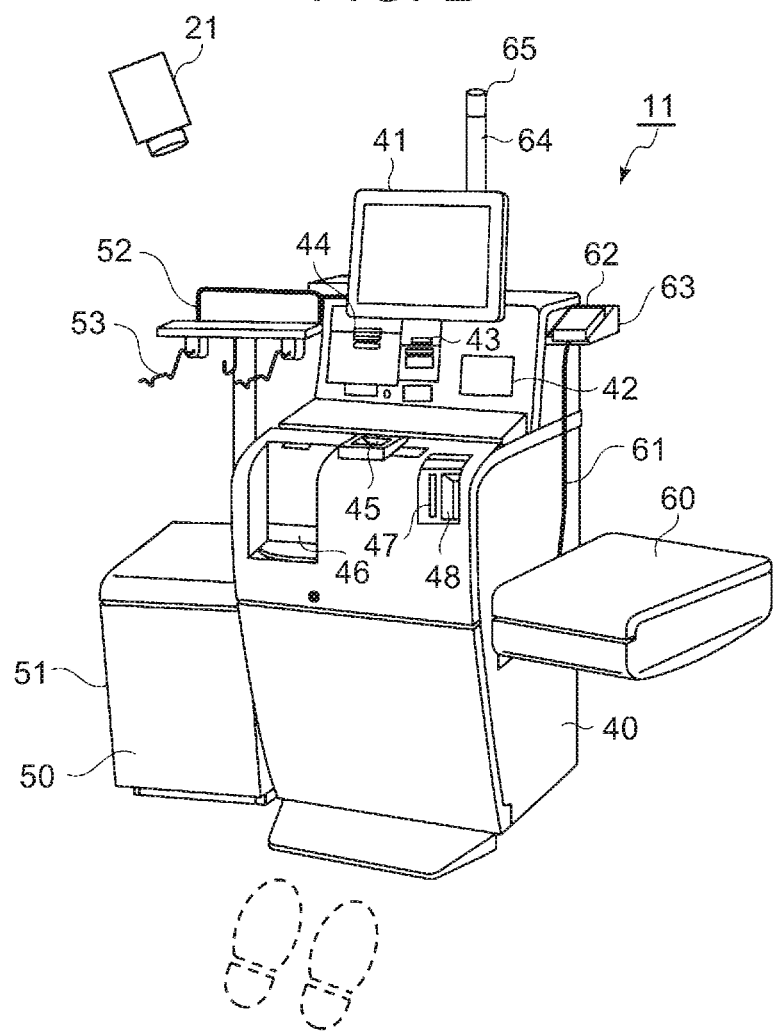
FIG. 2 is a diagram illustrating a self-service POS terminal and a camera.

FIG. 2 is a diagram illustrating the self-service POS terminal 11 and the camera 21. First, the exterior of the self-service POS terminal 11 is described.

The self-service POS terminal 11 includes a main body 40 installed on a floor and a bagging stand 50 installed beside the main body 40. The main body 40 further includes a touch panel 41 attached on an upper portion thereof. The touch panel 41 includes a display and a touch sensor. The display is a device for displaying various screens to an operator who operates the self-service POS terminal 11. The touch sensor is a device for detecting a touch input on the screen by the operator. The operator of the self-service POS terminal 11 is generally a customer.

The main body 40 includes a basket stand 60 on a central portion of a side surface thereof on the side on which the bagging stand 50 is not installed. The basket stand 60 is used for the operator to place a basket or the like in which purchased merchandise is stored. The customer stands in front of the main body 40 in FIG. 2 to look at the screen of the touch panel 41 and performs an operation. Therefore, when viewed from the customer, the basket stand 60 is on the right side, and the bagging stand 50 is on the left side so that the main body 40 is sandwiched therebetween. In the following description, a side where the customer stands is referred to as the front side of the main body 40, and a side where the bagging stand 50 is installed is referred to as the left side of the main body 40, and a side where the basket stand 60 is provided is referred to as the right side of the main body 40.

The main body 40 includes a reading window 42 of a scanner, a card insertion port 43, a receipt dispenser port 44, a coin slot 45, a coin discharge port 46, a bill slot 47, and a bill discharge port 48 on the front surface thereof. In addition, a communication cable 61 extends from the right side surface of the main body 40 to the outside and a reader and writer 62 for an electronic money medium is connected at the end of the communication cable 61. The reader and writer 62 is placed on a placing stand 63 provided on the upper portion of the right side surface of the main body 40.

The main body 40 includes a display pole 64 attached to the upper surface thereof. The display pole 64 includes a light emitting unit 65 that selectively emits, for example, blue and red light at the end portion thereof. The display pole 64 indicates the state of the self-service POS terminal 11, for example, standing-by, operating, calling, or in-error, by colors of the emitted light of the light emitting unit 65.

The bagging stand 50 has a bag holder 52 that is attached to an upper portion of a housing 51. The bag holder 52 includes a pair of holding arms 53, and is configured to hold a grocery bag supplied by the store or alternatively a shopping bag provided by a customer (a so-called "my-bag") with the holding arms 53.

Hereinafter, a positional relationship between the self-service POS terminal 11 and the camera 21 is described.

As illustrated in FIG. 2, the camera 21 is installed so as to photograph from above a customer who stands in front of the self-service POS terminal 11 and faces the components of the self-service POS terminal 11, such as the main body 40, the bagging stand 50, and the basket stand 60.

The customer who stands in front of the self-service POS terminal 11 first places a basket into which items of merchandise to be purchased are put on the basket stand 60 on the right side thereof and causes the holding arm 53 on the left side to hold a grocery bag, a "my-bag" (that is, a customer-provided bag), or the like. Subsequently, the customer operates the touch panel 41 according to a guidance displayed on the touch panel 41 to declare the start of operations using the self-service POS terminal 11.

Thereafter, the customer picks up each item of merchandise to be purchased one by one from the basket on the basket stand 60. Also, when a barcode is attached to the merchandise, the customer holds the barcode over the reading window 42 to be read by the scanner and thus performs merchandise registration. When a barcode is not attached to the purchased merchandise, the customer can operate the touch panel 41 to select the type of purchased merchandise from a list of items lacking barcodes. The customer puts the items of merchandise for which the registration has been completed into a grocery bag, a "my-bag," or the like.

The customer who has completed registration of all merchandise next operates the touch panel 41 and selects a settlement method. For example, when cash settlement is selected, the customer inserts a bill(s) or a coin(s) into the bill slot 47 or the coin slot 45 and takes out the change from the bill discharge port 48 or the coin discharge port 46. For example, if electronic money settlement is selected, the customer holds the electronic money medium over the reader and writer 62. For example, when credit card settlement is selected, the customer inserts the credit card into the card insertion port 43. In this manner, once the settlement is completed, the customer receives a receipt dispensed from the receipt dispenser port 44 and then leaves the store with the grocery bag or the "my-bag" taken from the holding arms 53.

That is, the camera 21 is installed at a position where the movement of the hands of the customer who behaves as above while in front of the self-service POS terminal 11 can be photographed.

FIG. 3 is a schematic diagram illustrating an example of the monitoring screen SC displayed on the display of the attendant terminal 14. As described above, the monitoring screens SC of each of the plurality of respective self-service POS terminals 11 is displayed on the display of the attendant terminal 14 in a divided manner. FIG. 3 illustrates an example of the monitoring screen SC with respect to one of the self-service POS terminals 11. The design of the monitoring screen SC of each of the other self-service POS terminals 11 is the same, and thus the description thereof is omitted.

As illustrated in FIG. 3, the monitoring screen SC includes a cashier number column 71, a terminal state column 72, an error information column 73, a declaration information column 74, a detail column 75, and a total column 76.

The cashier number column 71 is a column for displaying a cashier number. Cashier numbers are a series of numbers that are allocated to the self-service POS terminals 11 without overlapping in order to identify them.

The cashier numbers are identification information for identifying the self-service POS terminals 11.

The terminal state column 72 is a column for displaying the operation state of the self-service POS terminal 11. In the present embodiment, as the operation state any one of the possible operations states "standing by", "use start", "registering", "settlement start", and "settling" can displayed in the terminal state column 72.

The operation state "standing by" corresponds to the state from the completion of the settlement of a previous customer to the declaration of the use start of the next customer. An initial image (start screen) is displayed on the touch panel of the self-service POS terminal 11 that is in the "standing by" state. The initial image is an image including touch buttons, for example, for enabling the customer to select whether to use a grocery bag supplied by the store or to use his or her own bag.

The operation state "use start" corresponds to the state during which a customer stands in front of the self-service POS terminal 11 and declares a usage start. The customer performs an input operation for selecting whether to use a grocery bag or a customer bag ("my-bag") via the initial image on the touch panel or the like. The bag type selection operation can be considered the declaration of the usage start in some examples. After the selection operation (or other start indication) is received, the operation state of the self-service POS terminal 11 enters the "use start" state.

The operation state "registering" corresponds to the state during which the registration operations on the items of merchandise being purchased are received. After a first item of merchandise is registered, the operation state of the self-service POS terminal 11 becomes "registering". Thereafter, until the transition to the settlement is declared, the operation state of the self-service POS terminal 11 maintains as "registering".

The operation "settlement start" corresponds to the state in which the customer has completed the registration of the merchandise then declared the transition to the settlement. A "payment" soft key can be displayed on the touch panel 41 of the self-service POS terminal 11 which is presently in the "registering" state. The customer who has completed the registration of merchandise touches the "payment" soft key to proceed to the settlement of the transaction. The pressing of the "payment" soft key can be considered the declaration of the transition to the settlement. Upon receiving this input operation, the operation state of the self-service POS terminal 11 becomes "settlement start".

The operation state "settling" corresponds to the state in which a settlement process such as cash settlement, electronic money settlement, or credit card settlement is being performed. For example, when a bill or a coin is inserted into the bill slot 47 or the coin slot 45, the operation state of the self-service POS terminal 11 becomes "settling". Then, if the settlement process is appropriately completed, the operation state of the self-service POS terminal 11 returns to "standing by".

The error information column 73 is a column for displaying error information generated by the self-service POS terminal 11. The error information is a communication error, a receipt fragment error, or the like. The declaration information column 74 is a column for displaying declaration information about the customer. For example, when the customer selects the use of his or her own bag, "bag not required" (which indicates that a store-provided grocery bag is not required) is displayed.

The detail column 75 is a column for displaying detailed information of merchandise being purchased and registered at the self-service POS terminal 11. The detailed information is, for example, the name of each merchandise, the number of items, the price of each merchandise, and the like. The total column 76 is a column for displaying information of the merchandise registered at the self-service POS terminal 11. Such information includes a total number of items, a total price, a paid amount, change, and the like.

In addition, the design of the monitoring screen SC is not limited to the example of FIG. 3. A column on which other items are displayed may be displayed. In addition, text displayed in FIG. 3 are not limited to thereto. Additional or another text may be displayed.

Figure 4:
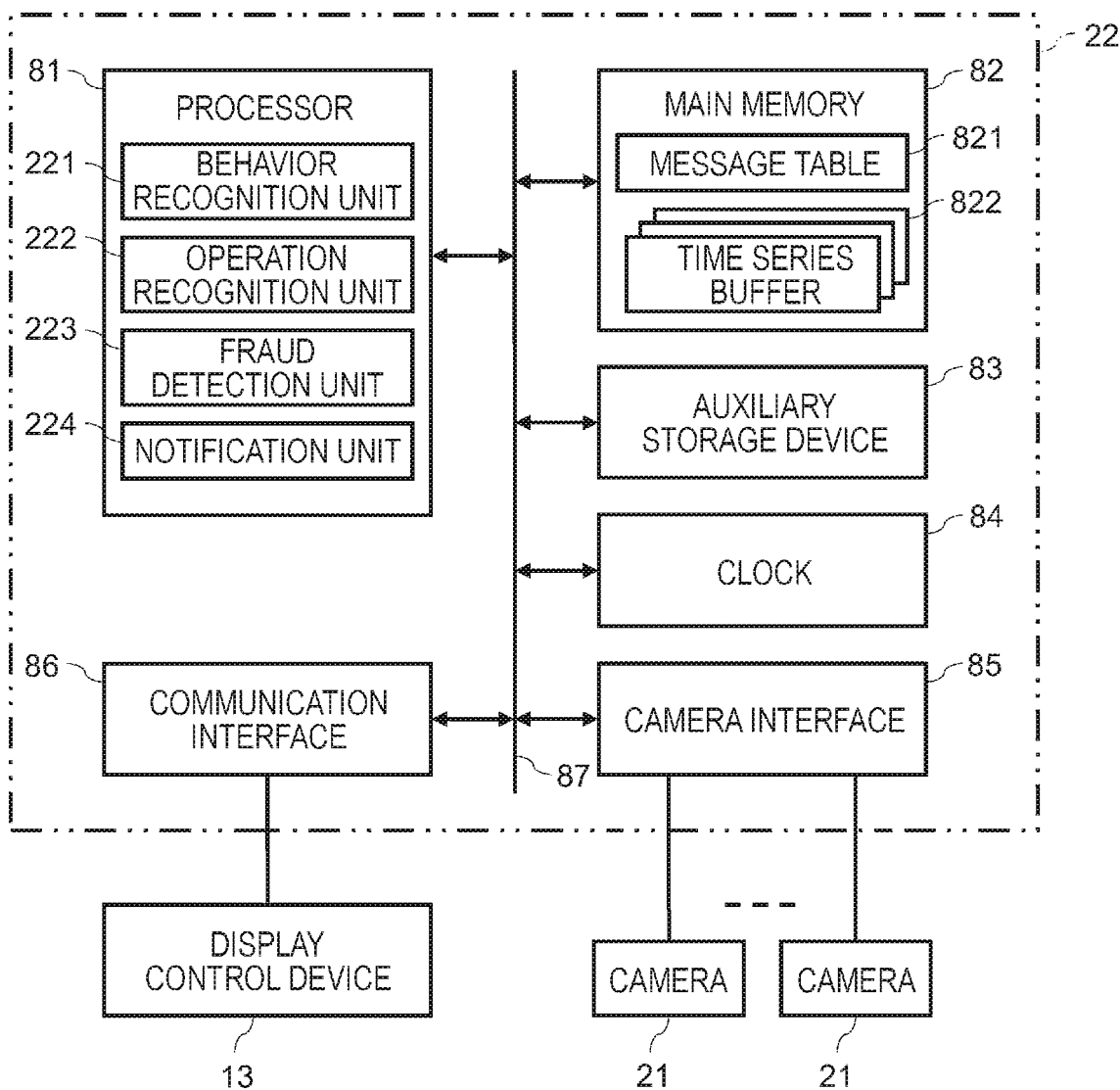
FIG. 4 is a circuit block diagram of a fraud behavior recognition device.

FIG. 4 is a block diagram of the fraud behavior recognition device 22. The fraud behavior recognition device 22 includes a processor 81, a main memory 82, an auxiliary storage device 83, a clock 84, a camera interface 85, a communication interface 86, and a system bus 87. The system bus 87 includes an address bus, a data bus, and the like. In the fraud behavior recognition device 22, the processor 81 is connected to the main memory 82, the auxiliary storage device 83, the clock 84, the camera interface 85, and the communication interface 86 via the system bus 87.

The processor 81 controls each unit according to an operating system or one or more application programs so that various functions as the fraud behavior recognition device 22 are performed. The processor 81 is, for example, a Central Processing Unit (CPU).

The main memory 82 includes a non-volatile memory area and a volatile memory area. The main memory 82 stores the operating system or the application programs in the non-volatile memory area. In the volatile memory area, the main memory 82 stores data required by the processor 81 to perform a process for controlling each unit. This kind of data may be stored in the non-volatile memory area. The volatile memory area is a work area where the data is rewritten by the processor 81. The non-volatile memory area is, for example, a Read Only Memory (ROM). The volatile memory area is, for example, a Random Access Memory (RAM).

The auxiliary storage device 83 is, for example, a well-known storage device such as a Solid State Drive (SSD), a Hard Disc Drive (HDD), or an Electric Erasable Programmable Read-Only Memory (EEPROM) used singly or in combination. The auxiliary storage device 83 stores data used by the processor 81 for performing various kinds of processes, data generated by a process of the processor 81, and the like. The auxiliary storage device 83 may store the application programs.

The application programs stored by the main memory 82 or the auxiliary storage device 83 include a control program described below. The method of installing the control program in the main memory 82 or the auxiliary storage device 83 is not particularly limited. The control program can be recorded on a removable recording medium and copied therefrom, or distributed by communication via a network to be installed in the main memory 82 or the auxiliary storage device 83. The recording medium may be in any form as long as a program can be stored and read such as a CD-ROM or a memory card.

The clock 84 functions as a time information source of the fraud behavior recognition device 22. The processor 81 obtains a current date and time based on the time information tracked by the clock 84.

The camera interface 85 is an interface circuit configured to communicate with the cameras 21. The imaged data output from the cameras 21 is imported to the fraud behavior recognition device 22 via the camera interface 85. The imaged data is data obtained by photographing the customer who operates the self-service POS terminal 11 corresponding to the camera 21.

The communication interface 86 is an interface circuit configured to communicate with the display control device 13. The image data output from the display control device 13 is imported to the fraud behavior recognition device 22 via the communication interface 86. The image data is data of the monitoring screen SC generated for each of the self-service POS terminals 11.

The fraud behavior recognition device 22 uses a portion of the volatile memory area in the main memory 82 as an area of a message table 821. The fraud behavior recognition device 22 generates and stores the message table 821 of the data structure illustrated in FIG. 5 in this area.

FIG. 5 is a schematic diagram illustrating a data structure of the message table 821. As illustrated, the message table 821 is a data table in which text data of each of a plurality of messages is described in correlation with a corresponding one of error codes EC. The error code EC and the text data of the message correlating thereto is described in the following description.

The fraud behavior recognition device 22 uses a portion of the volatile memory area in the main memory 82 as an area of a time-series buffer 822. The fraud behavior recognition device 22 generates and stores a predetermined number of time-series buffers 822 of the data structure as illustrated in FIG. 6 in this area. The predetermined number is same as the number of the self-service POS terminals 11.

FIG. 6 is a schematic diagram illustrating a data structure of one of the time-series buffers 822. As illustrated, the time-series buffer 822 includes areas for describing statuses ST or the error codes EC in an ascending order of time TM for each of the cashier numbers identifying the self-service POS terminals 11. The status ST is also described in the following description.

In order to reduce fraud by the customer at the self-service POS terminal 11, the processor 81 of the fraud behavior recognition device 22 performs the functions of the behavior recognition unit 221, the operation recognition unit 222, the fraud detection unit 223, and the notification unit 224 according to the control program.

The functions of the behavior recognition unit 221, the operation recognition unit 222, the fraud detection unit 223, and the notification unit 224 are performed for each of the self-service POS terminals 11. Therefore, hereinafter, the functions of the behavior recognition unit 221, the operation recognition unit 222, the fraud detection unit 223, and the notification unit 224 with respect to one self-service POS terminal 11 is specifically described. Since the functions of the behavior recognition unit 221, the operation recognition unit 222, the fraud detection unit 223, and the notification unit 224 with respect to the other self-service POS terminals 11 are the same, the description thereof is omitted here.

Figure 7:
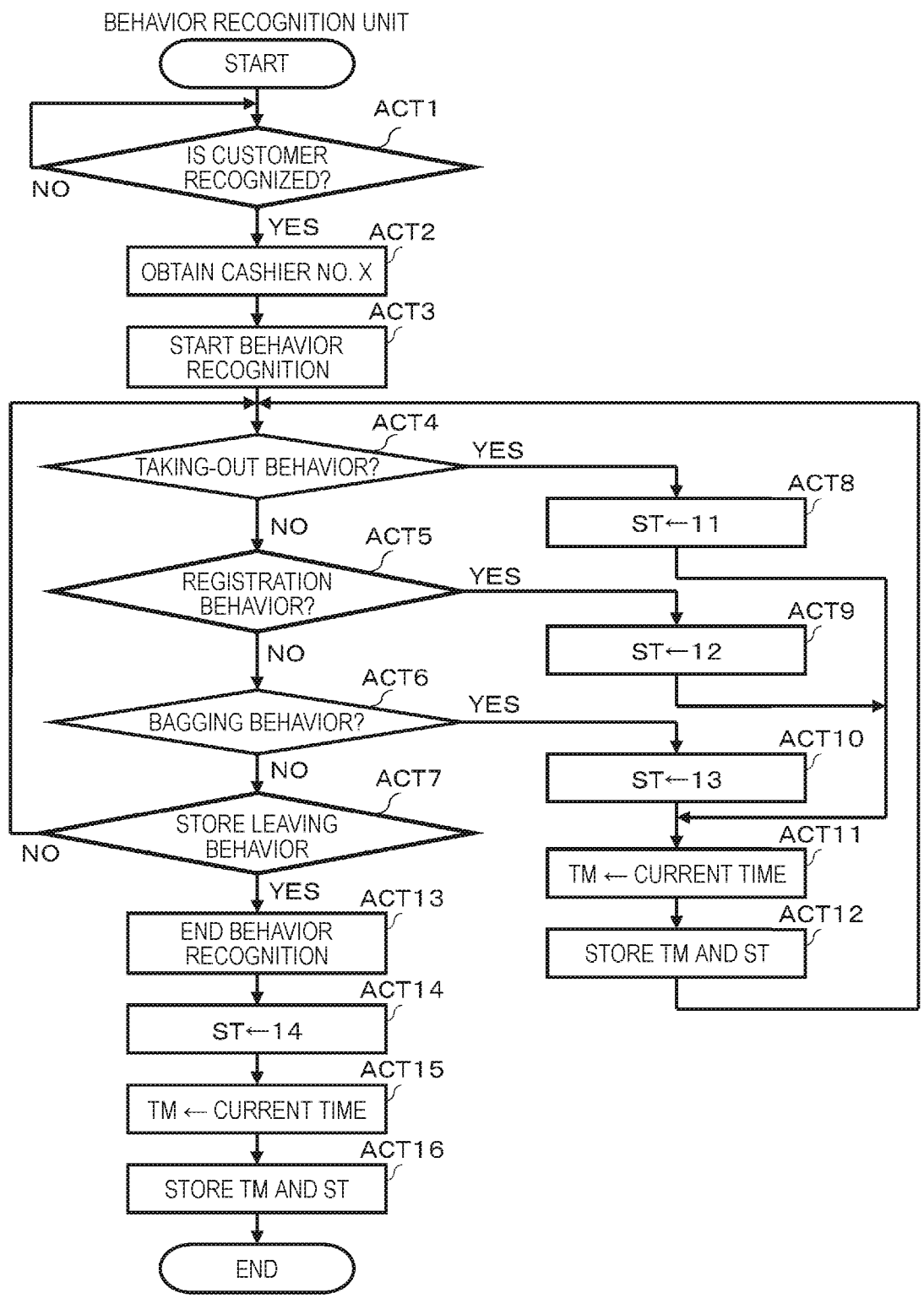
FIG. 7 is a flowchart of a function of a behavior recognition unit.

FIG. 7 is a flowchart of the function of the behavior recognition unit 221.

The processor 81 waits for recognition of a customer in ACT 1. The camera 21 is installed at a position where a customer standing in front of the self-service POS terminal 11 can be photographed from the above. If the processor 81 detects that a customer stands in front of the self-service POS terminal 11 from video data of the camera 21, it is determined that a customer is recognized.

If the customer is recognized, the processor 81 determines YES in ACT 1 and proceeds to ACT 2. The processor 81 obtains a cashier number of the self-service POS terminal 11 in ACT 2. The cameras 21 have one-to-one correspondence to the self-service POS terminals 11. Then, the processor 81 specifies the self-service POS terminal 11 from the identification information of the camera 21 that has photographed the customer who stands in front of the self-service POS terminal 11 and obtains the cashier number thereof.

The processor 81 starts behavior recognition of the customer in ACT 3. Specifically, the processor 81 determines a skeletal structure of the customer's body based on the image photographed by the camera 21. The skeletal structure determination can be made according to a known method using an economical camera and an AI technology such as deep learning. The processor 81 recognizes a taking-out behavior, a registration behavior, a bagging behavior, or a store leaving behavior of the customer from the movement of the hands obtained by the skeletal structure determination.

The taking-out behavior corresponds to taking out merchandise from a basket placed on the basket stand 60. For example, a movement in which a part of the skeletal structure of the customer, e.g., one hand or both hands, moves to the right side of the main body 40 and then lifts an item of merchandise is detected, the processor 81 recognizes that there is a taking-out behavior.

The registration behavior corresponds to the entry (registration) of data for the merchandise that has been taken out from the basket with the self-service POS terminal 11. For example, when a movement in which the skeletal structure of the hand that performs the taking-out behavior holds the merchandise over the reading window 42 in the center of the main body 40 is detected, the processor 81 recognizes there is a registration behavior. Alternatively, if a movement in which the skeletal structure of one hand operates the touch panel 41 of the main body 40 is detected, the processor 81 recognizes there is a registration behavior.

The bagging behavior corresponds to the putting of the registered merchandise into a grocery bag, the customer's bag, or the like on the bagging stand 50. For example, a movement in which the skeletal structure of the hand that has just performed the registration behavior moves to the left side of the main body and puts merchandise into a grocery bag is detected, the processor 81 recognizes that there is a bagging behavior.

The store leaving behavior corresponds to the customer who has completed the settlement leaving (walking away) the self-service POS terminal 11. For example, after a movement in which the skeletal structure of the hand of the customer who has completed the settlement processing removes the grocery bag, the customer's bag, or the like from the holding arms 53, then can no longer be detected from the video data of the camera 21, the processor 81 recognizes that there is a store leaving behavior.

In ACTS 4 to 7, the processor 81 waits for the recognition of a taking-out behavior, a registration behavior, a bagging behavior, or a store leaving behavior. In this waiting state, if the taking-out behavior is recognized, the processor 81 determines YES in ACT 4 and proceeds to ACT 8. The processor 81 sets the status ST as "11" in ACT 8. If the registration behavior is recognized, the processor 81 determine YES in ACT 5 and proceeds to ACT 9. The processor 81 sets the status ST as "12" in ACT 9. If the bagging behavior is recognized, the processor 81 determines YES in ACT 6 and proceeds to ACT 10. The processor 81 sets the status ST as "13" in ACT 10.

After the process of any one of ACT 8, 9, or 10 is completed, the processor 81 proceeds to ACT 11. The processor 81 obtains the current time TM tracked by the clock 84 in ACT 11. Then, the processor 81 stores the time TM and the status ST in a correlated manner in the time-series buffer 822 to which the cashier number obtained in the process of ACT 2 is set in ACT 12. Thereafter, the processor 81 returns to the waiting state of ACTS 4 to 7.

In this manner, when the taking-out behavior with respect to the self-service POS terminal 11 is recognized by the function of the behavior recognition unit 221, "11" is recorded as the status ST together with the time TM in the time-series buffer 822 in which the corresponding cashier number of the self-service POS terminal 11 is set. In the same manner, when the registration behavior is recognized, "12" is recorded as the status ST together with the time TM in the same time-series buffer 822. When the bagging behavior is recognized, "13" is recorded as the status ST together with the time TM in the same time-series buffer 822.

Generally, the customer sequentially repeats the taking-out behavior, the registration behavior, and the bagging behavior on the self-service POS terminal 11, to register data of the merchandise to be purchased to the self-service POS terminal 11. Therefore, the statuses ST are stored in time series in the order of "11", "12", and "13" in the time-series buffer 822.

In the waiting state of ACTS 4 to 7, when the store leaving behavior is recognized, the processor 81 determines YES in ACT 7 and proceeds to ACT 13. The processor 81 ends the behavior recognition of the customer as ACT 13.

The processor 81 that has ended the behavior recognition sets the status ST as "14" in ACT 14. The processor 81 obtains the current time TM tracked by the clock 84 in ACT 15. Then, the processor 81 stores the time TM and the status ST in a correlating manner in the time-series buffer 822 in which the cashier number obtained in the process of ACT 2 is set in ACT 16. Therefore, "14" is stored as the status ST together with the time TM in the time-series buffer 822 corresponding to the self-service POS terminal 11 of which the customer has left the store.

In the above, the processor 81 completes the function of the behavior recognition unit 221. Thereafter, if a customer standing in front of the self-service POS terminal 11 is detected again from the video data of the camera 21, the processor 81 performs the processes of ACTS 2 to 16 as described above for that new customer.

Figure 8:
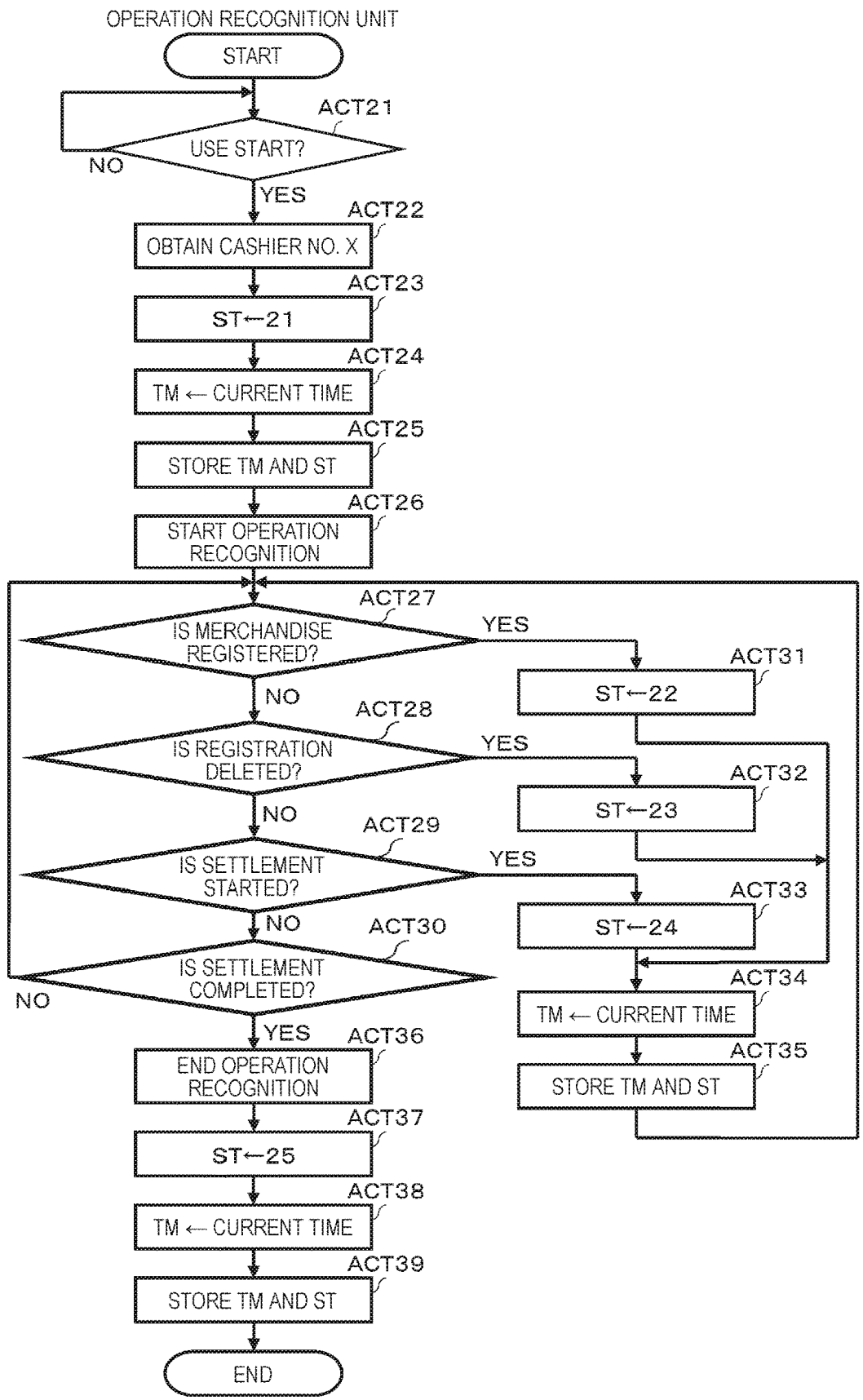
FIG. 8 is a flowchart of a function of an operation recognition unit.

FIG. 8 is a flowchart of the function of the operation recognition unit 222.

The processor 81 waits for the declaration of the use start with respect to the self-service POS terminal 11 as ACT 21. If the use start is declared, the characters "use start" is displayed in the terminal state column 72 of the monitoring screen SC corresponding to the self-service POS terminal 11. The processor 81 confirms whether the characters of "use start" are shown in the terminal state column 72 of the monitoring screen SC obtained via the display control device 13. When the characters of the "use start" are recognized, the processor 81 recognizes that the use start is declared.

If the declaration of the use start is recognized, the processor 81 determines YES in ACT 1 and proceeds to ACT 2. The processor 81 obtains the cashier number of the self-service POS terminal 11 as ACT 2. The cashier number is displayed in the cashier number column 71 of the monitoring screen SC. The processor 81 recognizes the cashier number from the cashier number column 71 of the monitoring screen SC obtained via the display control device 13 to obtain the cashier number.

The processor 81 sets the status ST as "21" in ACT 23. The processor 81 obtains the current time TM tracked by the clock 84 in ACT 24. Then, the processor 81 stores the time TM and the status ST in a correlating manner in the time-series buffer 822 in which the cashier number obtained in the process of ACT 22 is set in ACT 25.

Therefore, when the customer standing in front of the self-service POS terminal 11 performs the declaration operation for the use start, "21" is first stored as the status ST together with the time TM thereof in the time-series buffer 822 corresponding to the self-service POS terminal 11.

The processor 81 starts operation recognition on the self-service POS terminal 11 in ACT 26. Specifically, the processor 81 recognizes a merchandise registration operation, a registration deletion operation, a settlement start operation, or a settlement end operation from the transition of the information obtained by character recognition of the monitoring screen SC obtained via the display control device 13.

For example, if detailed information such as a merchandise name, the number of items, and a price of the merchandise is added to the detail column 75, the processor 81 recognizes that there is a merchandise registration operation. For example, if a total number of items or a total price displayed on the total column 76 is reduced, the processor 81 recognizes that there is a registration deletion operation. For example, if the display of the terminal state column 72 is switched to the "settlement start", the processor 81 recognizes that there is a settlement start operation. For example, if the display of the terminal state column 72 is switched to the "standing by", the processor 81 recognizes that there is a settlement end operation.

In ACTS 27 to 30, the processor 81 waits for the recognition of the merchandise registration operation, the registration deletion operation, the settlement start operation, and the settlement end operation. If the merchandise registration operation is recognized, the processor 81 determine YES in ACT 27 and proceeds to ACT 31. The processor 81 sets the status ST as "22" in ACT 31. If the registration deletion operation is recognized, the processor 81 determines YES in ACT 28 and proceeds to ACT 32. The processor 81 sets the status ST as "23" in ACT 32. If the settlement start operation is recognized, the processor 81 determines YES in ACT 29 and proceeds to ACT 33. The processor 81 sets the status ST as "24" in ACT 33.

If the process of ACT 31, 32, or 33 is completed, the processor 81 proceeds to ACT 34. The processor 81 obtains the current time TM tracked by the clock 84 in ACT 34. Then, in ACT 35, the processor 81 stores the time TM and the status ST in a correlating manner in the time-series buffer 822 to which the cashier number obtained in the process of ACT 22 is set. Thereafter, the processor 81 returns to the waiting state of ACTS 27 to 30.

In this manner, when the merchandise registration operation with respect to the self-service POS terminal 11 is recognized by the function of the operation recognition unit 222, "22" is stored as the status ST together with the time TM thereof in the time-series buffer 822 in which the cashier number of the corresponding self-service POS terminal 11 is set. In the same manner, when the registration deletion operation is recognized, "23" is recorded as the status ST together with the time TM thereof, to the same time-series buffer 822. When the settlement start operation is recognized, "24" is recorded as the status ST together with the time TM to the same time-series buffer 822.

Generally, by the registration behavior of the customer, the merchandise registration operation or the registration deletion operation is performed on the self-service POS terminal 11. Therefore, after the status ST indicating the registration behavior, that is, "12", the status indicating the merchandise registration operation or the registration deletion operation, that is, "22" or "23" is stored in the time-series buffer 822.

In addition, the customer who have completed the bagging behavior of all registered merchandise declares the settlement start. Therefore, after the status ST indicating the bagging behavior, that is, "13", the status indicating the settlement start operation, that is, "24" is stored in the time-series buffer 822.

In the waiting state of ACTS 27 to 30, if the settlement end operation is recognized, the processor 81 determines YES in ACT 30 and proceeds to ACT 36. The processor 81 ends the operation recognition with respect to the self-service POS terminal 11 in ACT 36.

The processor 81 that has ended the operation recognition sets the status ST as "25" in ACT 37. The processor 81 obtains the current time TM tracked by the clock 84 in ACT 38. Then, the processor 81 stores the time TM and the status ST "25" in a correlating manner in the time-series buffer 822 in which the cashier number obtained in the process of ACT 22 is set in ACT 39. Therefore, "25" is stored as the status ST together with the time TM in the time-series buffer 822 corresponding to the self-service POS terminal 11 which ends the settlement.

In the above, the processor 81 has performed the function of the operation recognition unit 222. Thereafter, if the use start operation of the self-service POS terminal 11 is detected from the data of the monitoring screen SC, again, the processor 81 performs the processes of ACTS 22 to 29 as described above.

Figure 9:
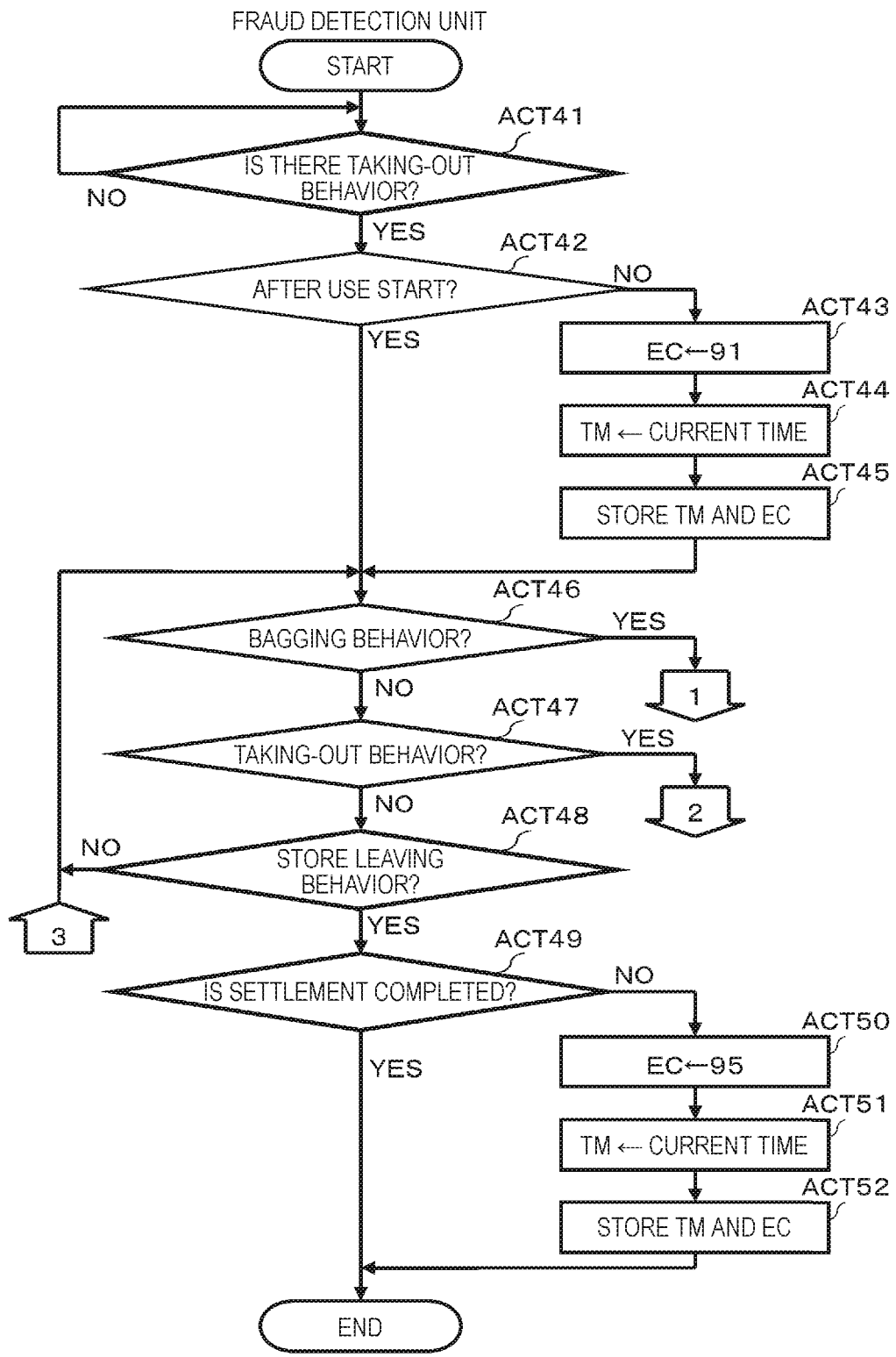
FIG. 9 through FIG. 11 are flowchart of functions of a fraud detection unit.
Figure 10:
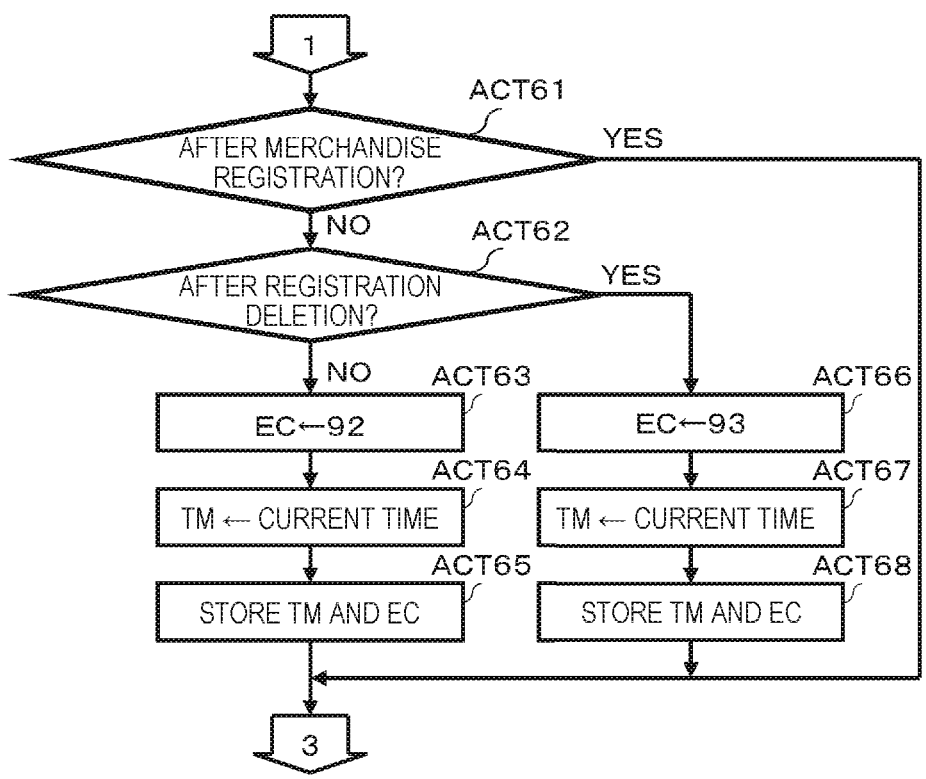
Figure 11:
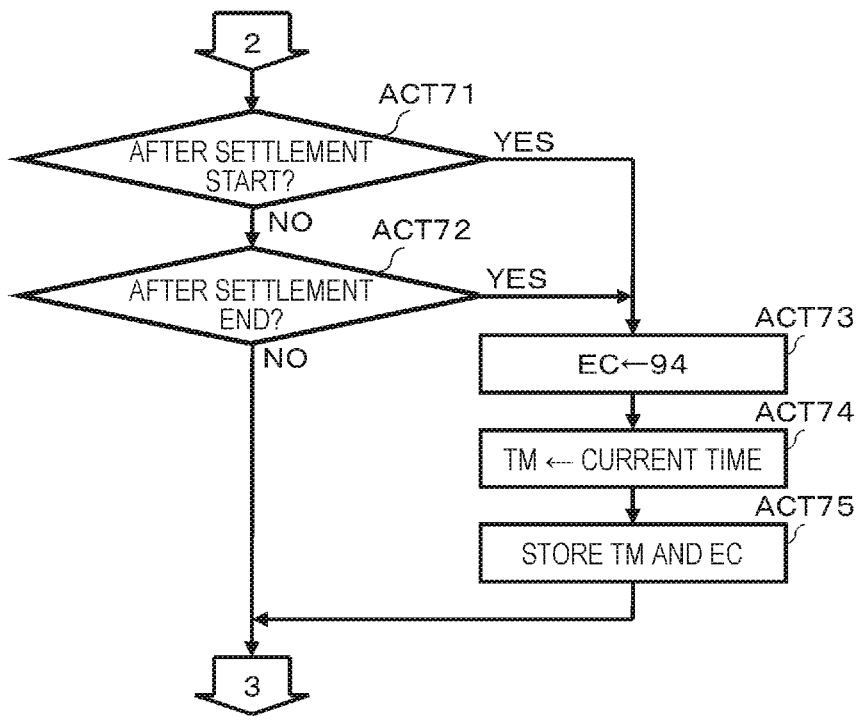

FIGS. 9 to 11 are flowcharts of the functions of the fraud detection unit 223.

The processor 81 waits for the recognition of the taking-out behavior by the function of the behavior recognition unit 221 in ACT 41. As described above, "11" is stored as the status ST in the time-series buffer 822 to which the cashier number of the self-service POS terminal 11 in which the taking-out behavior has been recognized is set. If the status ST "11" in the time-series buffer 822 is detected, the processor 81 determines YES in ACT 41 and proceeds to ACT 42.

The processor 81 confirms whether the state is after the use start operation in ACT 42. If the use start operation has been performed on the self-service POS terminal 11, "21" is stored as the status ST in the time-series buffer 822. Then, the processor 81 searches the time-series buffer 822 from the time TM when "11" has been stored as the status ST in the reverse chronological direction. Then, if the status "21" is found, the processor 81 determines that the status is after the use start operation. Thereafter, if "14" or "25" is found as the status, or the search of the time-series buffer 822 is completed, the processor 81 determines that the status is not after the use start operation.

When the status is not after the use start, the processor 81 determines NO in ACT 42 and proceeds to ACT 43. The processor 81 sets the error code EC as "91" in ACT 43. In addition, the processor 81 obtains the current time TM tracked by the clock 84 in ACT 44. Then, the processor 81 stores the time TM and the error code EC in a correlating manner in the time-series buffer 822 in ACT 45. Thereafter, the processor 81 proceeds to ACT 46.

If the state is after the use start, the processor 81 determines YES in ACT 42. The processor 81 skips the processes of ACTS 43 to 45 and proceeds to ACT 46.

Therefore, at the self-service POS terminal 11 for which the use start declaration operation has not been performed, if the taking-out behavior of the merchandise is recognized, "91" is stored as the error code EC in the time-series buffer 822 for which the cashier number of the self-service POS terminal 11 is set.

In this manner, even though the recognition of the use start operation has not been performed, if the taking-out behavior is recognized, "91" is stored as the error code EC in the time-series buffer 822. That is, "91" as the error code EC is a code for identifying an action of the customer who has performed the taking-out behavior without performing the declaration operation of the use start as a fraud behavior "unauthorized taking-out".

The processor 81 confirms whether the bagging behavior has been recognized by the function of the behavior recognition unit 221 in ACT 46. As described above, if the bagging behavior is recognized, "12" is stored as the status ST in the time-series buffer 822. If "12" is not stored as the status ST in the time-series buffer 822, the processor 81 determines NO in ACT 46 and proceeds to ACT 47.

The processor 81 confirms whether the taking-out behavior has been recognized by the function of the behavior recognition unit 221 in ACT 47. As described above, if the taking-out behavior is recognized, "11" is described as the status ST to the time-series buffer 822. If "11" is not stored as the status ST in the time-series buffer 822, the processor 81 determines NO in ACT 47 and proceeds to ACT 48.

The processor 81 confirms whether the store leaving behavior has been recognized by the function of the behavior recognition unit 221 in ACT 48. As described above, if the store leaving behavior is recognized, "14" is stored as the status ST in the time-series buffer 822. If "14" is not stored as the status ST in the time-series buffer 822, the processor 81 determines NO in ACT 48 and returns to ACT 46.

Here, in ACTS 46 to 48, the processor 81 waits for the customer who has performed the taking-out behavior of the first merchandise to perform the bagging behavior, perform the taking-out behavior of another merchandise, or perform the store leaving behavior.

In this waiting state, if "13" is stored as the status ST in the time-series buffer 822, the processor 81 determines YES in ACT 46 and proceeds to ACT 61 of FIG. 10.

The processor 81 confirms whether the state is after the merchandise registration operation in ACT 61. As described above, if the merchandise registration operation is recognized by the function of the operation recognition unit 222, "22" is stored as the status ST in the time-series buffer 822. Accordingly, if "22" is stored as the status ST in correlation with the time TM immediately before the time TM when "13" is stored as the status ST, the processor 81 recognizes that the state is after the merchandise registration operation. The processor 81 determines NO in ACT 61 and returns to ACT 46 of FIG. 9. That is, the processor 81 returns to the waiting state of ACTS 46 to 48.

In contrast, if "22" is not described as the status ST in correlation with the time TM immediately before the time TM when "13" is stored as the status ST, the processor 81 recognizes that the state is not after the merchandise registration operation. The processor 81 determines YES in ACT 61 and proceeds to ACT 62.

The processor 81 confirms whether the state is after the registration deletion operation in ACT 62. As described above, if the registration deletion operation is recognized by the function of the operation recognition unit 222, "23" is stored as the status ST in the time-series buffer 822. Therefore, if "23" is stored as the status ST in correlation with the time TM immediately before the time TM when "13" is stored as the status ST, the processor 81 recognizes that the state is after the registration deletion operation. In other words, if "23" is not stored as the status ST in correlation with the time TM immediately before the time TM when "13" is stored as the status ST, the processor 81 recognizes that the state is not after the registration deletion operation.

If the state is not after the registration deletion operation, the processor 81 determines NO in ACT 62 and proceeds to ACT 63. The processor 81 sets the error code EC as "92" in ACT 63. The processor 81 obtains the current time TM tracked by the clock 84 as ACT 64. Then, the processor 81 stores the time TM and the error code EC in a correlated manner in the time-series buffer 822 in which "13" is stored as the status ST in ACT 65. Thereafter, the processor 81 returns to ACT 46 of FIG. 9. That is, the processor 81 returns to the waiting state of ACTS 46 to 48.

In this manner, even though the merchandise registration operation or the registration deletion operation is not recognized, if the bagging behavior is recognized, "92" is stored as the error code EC in the time-series buffer 822. That is, "92" as the error code EC is a code for identifying an action of the customer who performs the bagging behavior of the merchandise for which the merchandise registration operation has not been performed as the fraud behavior "fake registration".

If the state is after the registration deletion operation, the processor 81 determine YES in ACT 62 and proceeds to ACT 66. The processor 81 sets the error code EC as "93" in ACT 66. The processor 81 obtains the current time TM tracked by the clock 84 in ACT 67. Then, the processor 81 stores the time TM and the error code EC in a correlating manner in the time-series buffer 822 to which "13" is stored as the status ST in ACT 68. Thereafter, the processor 81 returns to ACT 46 of FIG. 9. That is, the processor 81 returns to the waiting state of ACTS 46 to 48.

In this manner, if the bagging behavior is recognized after the registration deletion operation is recognized, "93" is stored as the error code EC in the time-series buffer 822. That is, "93" as the error code EC is a code for identifying an action of the customer who performs the bagging behavior of the merchandise for which the registration deletion operation has been performed as a fraud behavior "false cancellation".

The description refers back to FIG. 9.

In the waiting state of ACTS 46 to 48, if "11" is stored as the status ST in the time-series buffer 822, or the taking-out behavior is recognized, the processor 81 proceeds to ACT 71 of FIG. 11. The processor 81 confirms whether the state is after the settlement start operation as ACT 71. As described above, if the settlement start operation is recognized by the function of the operation recognition unit 222, "24" is stored as the status ST in the time-series buffer 822. Accordingly, if "24" is stored as the status ST in correlation with the time TM immediately before the time TM when "11" is stored as the status ST, the processor 81 recognizes that the state is after settlement start operation. In other words, if "24" is not stored as the status ST in correlation with the time TM immediately before the time TM when "11" is stored as the status ST, the processor 81 recognizes that the state is not after the settlement start operation.

If the state is not after the settlement start operation, the processor 81 determines NO in ACT 71 and proceeds to ACT 72. The processor 81 confirms whether the state is after the settlement end operation in ACT 72. As described above, if the settlement end operation is recognized by the function of the operation recognition unit 222, "25" is stored as the status ST in the time-series buffer 822. Therefore, if "25" is stored as the status ST in correlation with the time TM immediately before the time TM when "11" is stored as the status ST, the processor 81 recognizes that the state is after the settlement end operation. In other words, if "25" is not stored as the status ST in correlation with the time TM immediately before the time TM when "11" is stored as the status ST, the processor 81 recognizes that the state is not after the settlement end operation.

If the state is not after the settlement end operation, the processor 81 determines NO in ACT 72 and returns to ACT 46 of FIG. 9. That is, the processor 81 returns to the waiting state of ACTS 46 to 48.

If the state is after the settlement start or after the settlement end, the processor 81 determines YES in ACT 71 or 72 and proceeds to ACT 73. The processor 81 sets the error code EC as "94" in ACT 73. The processor 81 obtains the current time TM tracked by the clock 84 in ACT 74. Then, the processor 81 stores the time TM and the error code EC in a correlating manner in the time-series buffer 822 to which "11" is stored as the status ST in ACT 75. Thereafter, the processor 81 returns to ACT 46 of FIG. 9. That is, the processor 81 returns to the waiting state of ACTS 46 to 48.

In this manner, even after the settlement start operation or the settlement end operation is recognized, if the merchandise taking-out behavior is recognized, "94" is stored as the error code EC in the time-series buffer 822. That is, "94" as the error code EC is a code for identifying an action of the customer who takes out an unregistered merchandise from the basket after the settlement start operation or the settlement end operation as the fraud behavior "registration omission".

The description refers back to FIG. 9.

In the waiting state of ACTS 46 to 48, if "14" is stored as the status ST in the time-series buffer 822, or the store leaving behavior is recognized, the processor 81 determines YES in ACT 48 and proceeds to ACT 49. The processor 81 confirms whether the state is after the settlement end operation in ACT 49. As described above, if the settlement end operation is recognized by the function of the operation recognition unit 222, "25" is stored as the status ST in the time-series buffer 822. Accordingly, if "25" is stored as the status ST in correlation with the time TM immediately before the time TM when "14" is stored as the status ST, the processor 81 recognizes that the state is after the settlement end operation. In other words, if "25" is not stored as the status ST in correlation with the time TM immediately before the time TM when "14" is described as the status ST, the processor 81 recognizes that the state is not after the settlement end operation.

If the state is after the settlement end operation, the processor 81 determines YES in ACT 49. The processor 81 ends the function as the fraud detection unit 223.

In contrast, if the state is not after the settlement end operation, the processor 81 determines NO in ACT 49 and proceeds to ACT 50. The processor 81 sets the error code EC as "95" in ACT 50. The processor 81 obtains the current time TM tracked by the clock 84 in ACT 51. Then, the processor 81 stores the time TM and the error code EC in a correlating manner in the time-series buffer 822 to which "14" is stored as the status ST in ACT 52.

In this manner, if the store leaving behavior is recognized even though the settlement end operation has not been recognized, "95" is stored as the error code EC in the time-series buffer 822. That is, "95" as the error code EC is a code for identifying an action of the customer who performs the store leaving behavior before the settlement end operation as a fraud behavior "unsettlement" (non-settlement).

In the above, the processor 81 ends the function as the fraud detection unit 223. Thereafter, if the taking-out behavior is recognized again, the processor 81 performs the processes of ACTS 42 to 52, ACTS 61 to 68 and ACTS 71 to 75 in the same manner as described above.

Figure 12:
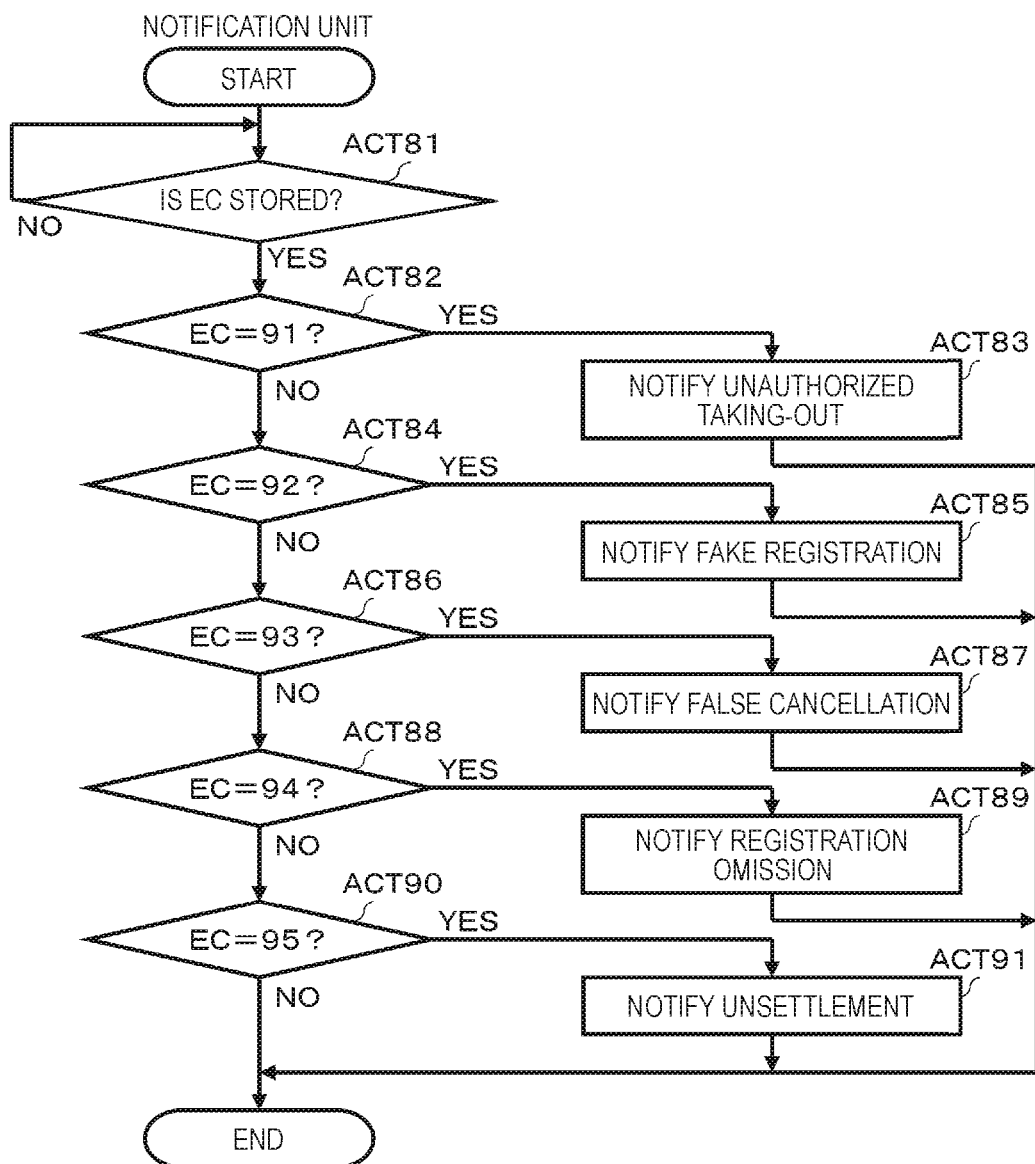
FIG. 12 is a flowchart of a function of a notification unit.

FIG. 12 is a flowchart of the function of the notification unit 224.

The processor 81 waits for the error code EC to be stored in the time-series buffer 822 as ACT 81. If the error code EC is stored in the time-series buffer 822, the processor 81 determines YES in ACT 81 and proceeds to ACT 82. The processor 81 confirms whether the error code EC is "91" in ACT 82.

If the error code EC is "91", the processor 81 determines YES in ACT 82 and proceeds to ACT 83. The processor 81 notifies of the fraud behavior "unauthorized taking-out" in ACT 83. That is, the processor 81 searches the message table 821 for the message data of the error code EC "91". In addition, the processor 81 obtains the cashier number of the time-series buffer 822 to which "91" is stored as the error code EC. That is, the processor 81 controls the communication interface 86 to output a notification command including the message data found by the search and the cashier number to the display control device 13.

The display control device 13 causes the monitoring screen SC of the attendant terminal 14 identified by the cashier number included in the notification command to display the text of the received message data. As a result, the text notifying the fraud behavior, for example, that "unauthorized taking-out has been performed at Cashier No. X" is displayed on the monitoring screen SC. Accordingly, the attendant can warn the customer using the self-service POS terminal 11 to which Cashier No. X is set that there is a fraud behavior "unauthorized taking-out".

If the error code EC is not "91", the processor 81 determines NO in ACT 82 and proceeds to ACT 84. The processor 81 confirms whether the error code EC is "92" as ACT 84.

If the error code EC is "92", the processor 81 determines YES in ACT 84 and proceeds to ACT 85. The processor 81 notifies of the fraud behavior "fake registration" as ACT 85. That is, the processor 81 searches the message table 821 for the message data of the error code EC "92". The processor 81 obtains the cashier number of the time-series buffer 822 to which "92" is stored as the error code EC. Then, the processor 81 controls the communication interface 86 to output the notification command including the message data and the cashier number to the display control device 13.

The display control device 13 causes the monitoring screen SC of the attendant terminal 14 identified by the cashier number included in the notification command to display the text of the received message data. As a result, a text notifying the fraud behavior, for example, that "fake registration has been performed at Cashier No. X" is displayed on the monitoring screen SC. Accordingly, the attendant can warn the customer using the self-service POS terminal 11 for which Cashier No. X is set that there is a fraud behavior "fake registration".

If the error code EC is not "92", the processor 81 determines NO in ACT 84 and proceeds to ACT 86. The processor 81 confirms whether the error code EC is "93" in ACT 86.

If the error code EC is "93", the processor 81 determines YES in ACT 86 and proceeds to ACT 87. The processor 81 notifies of the fraud behavior "false cancellation" as ACT 87. That is, the processor 81 searches the message table 821 for the message data of the error code EC "93". The processor 81 obtains the cashier number of the time-series buffer 822 to which "93" is stored as the error code EC. Also, the processor 81 controls the communication interface 86 to output the notification command including the message data and the cashier number to the display control device 13.

The display control device 13 causes the monitoring screen SC of the attendant terminal 14 identified by the cashier number included in the notification command to display the text of the received message data. As a result, a text notifying the fraud behavior, for example, that "false cancellation has been performed at Cashier No. X" is displayed on the monitoring screen SC. Accordingly, the attendant can warn the customer using the self-service POS terminal 11 for which Cashier No. X is set that there is a fraud behavior "false cancellation".

If the error code EC is not "93", the processor 81 determines NO in ACT 86 and proceeds to ACT 88. The processor 81 confirms whether the error code EC is "94" in ACT 88.

If the error code EC is "94", the processor 81 determines YES in ACT 88 and proceeds to ACT 89. The processor 81 notifies of the fraud behavior "registration omission" in ACT 89. That is, the processor 81 searches the message table 821 for the message data of the error code EC "94". The processor 81 obtains the cashier number of the time-series buffer 822 to which "94" is stored as the error code EC. The processor 81 controls the communication interface 86 to output the notification command including the message data and the cashier number to the display control device 13.

The display control device 13 causes the monitoring screen SC of the attendant terminal 14 identified by the cashier number included in the notification command to display the text of the received message data. As a result, a text notifying the fraud behavior, for example, that "registration has been omitted at Cashier No. X" is displayed on the monitoring screen SC. Accordingly, the attendant can warn the customer using the self-service POS terminal 11 for which Cashier No. X is set that there is a fraud behavior "registration omission".

If the error code EC is not "94", the processor 81 determines NO in ACT 88 and proceeds to ACT 90. The processor 81 confirms whether the error code EC is "95" in ACT 90.

If the error code EC is "95", the processor 81 determines YES in ACT 90 and proceeds to ACT 91. The processor 81 notifies of the fraud behavior "unsettlement" in ACT 91. That is, the processor 81 searches the message table 821 for the message data of the error code EC "95". The processor 81 obtains the cashier number of the time-series buffer 822 to which "95" is stored as the error code EC. Then, the processor 81 controls the communication interface to output the notification command including the message data and the cashier number to the display control device 13.

The display control device 13 causes the monitoring screen SC of the attendant terminal 14 identified by the cashier number included in the notification command to display the text of the received message data. As a result, a text notifying the fraud behavior, for example, that "settlement has not been completed at Cashier No. X" is displayed on the monitoring screen SC. Accordingly, the attendant can warn the customer using the self-service POS terminal 11 for which Cashier No. X is set that there is a fraud behavior "unsettlement".

As described above, the fraud behavior recognition device 22 has a function of recognizing the behavior of the customer using the self-service POS terminal 11 based on the imaged data of the camera 21, as the behavior recognition unit 221. The fraud behavior recognition device 22 has a function of recognizing an operation on the self-service POS terminal 11 by the customer based on the transition of the monitoring screen SC displayed on the attendant terminal 14, as the operation recognition unit 222. The fraud behavior recognition device 22 has a function of detecting a fraud behavior of the customer based on a correspondence relationship of the behavior of the customer and the operation on the self-service POS terminal 11 by the corresponding customer, as the fraud detection unit 223. That is, the fraud behavior recognition device 22 detects the fraud behavior of the customer when the procedure of the operations recognized by the operation recognition unit 222 contradicts the behavior of the customer recognized by the behavior recognition unit 221.

For example, when the taking-out behavior is recognized without the declaration operation of the use start, the fraud behavior "unauthorized taking-out" is detected. If the bagging behavior of the merchandise without the merchandise registration operation is recognized, the fraud behavior "fake registration" is detected. If the bagging behavior of the merchandise is recognized after the registration deletion operation, the fraud behavior "false cancellation" is detected. If the taking-out behavior is recognized after the settlement start operation or the settlement end operation, the fraud behavior "registration omission" is detected. When the store leaving behavior is recognized without the settlement end operation, the fraud behavior "unsettlement" is detected.

The fraud behavior recognition device 22 has a function of notifying the attendant of the fraud behavior of the customer by using the attendant terminal 14 as the notification unit 224. Accordingly, the attendant who has confirmed the notification can warn the corresponding customer quickly. As a result, the fraud behavior of the customer on the self-service POS terminal 11 is suppressed.

In this manner, according to the present embodiment, an effect of suppressing various fraud behaviors of a customer can be achieved.

In the above, embodiments of a technology for suppressing the fraud behavior of the customer using the self-service POS terminal 11 is described, but the embodiments are not limited thereto.

In the above embodiments, as a case where the fraud detection unit 223 detects the fraud behavior of the customer, a case in which the procedure of the operations recognized by the operation recognition unit 222 contradicts the behavior of the customer recognized by the behavior recognition unit 221 is exemplified. The technology of detecting fraud behaviors by the fraud detection unit 223 is not limited thereto. For example, it is conceivable that the fraud detection unit 223 detects a fraud behavior of a customer when the number of times of the operations recognized by the operation recognition unit 222 contradicts a behavior of the customer recognized by the behavior recognition unit 221.

Figure 13:
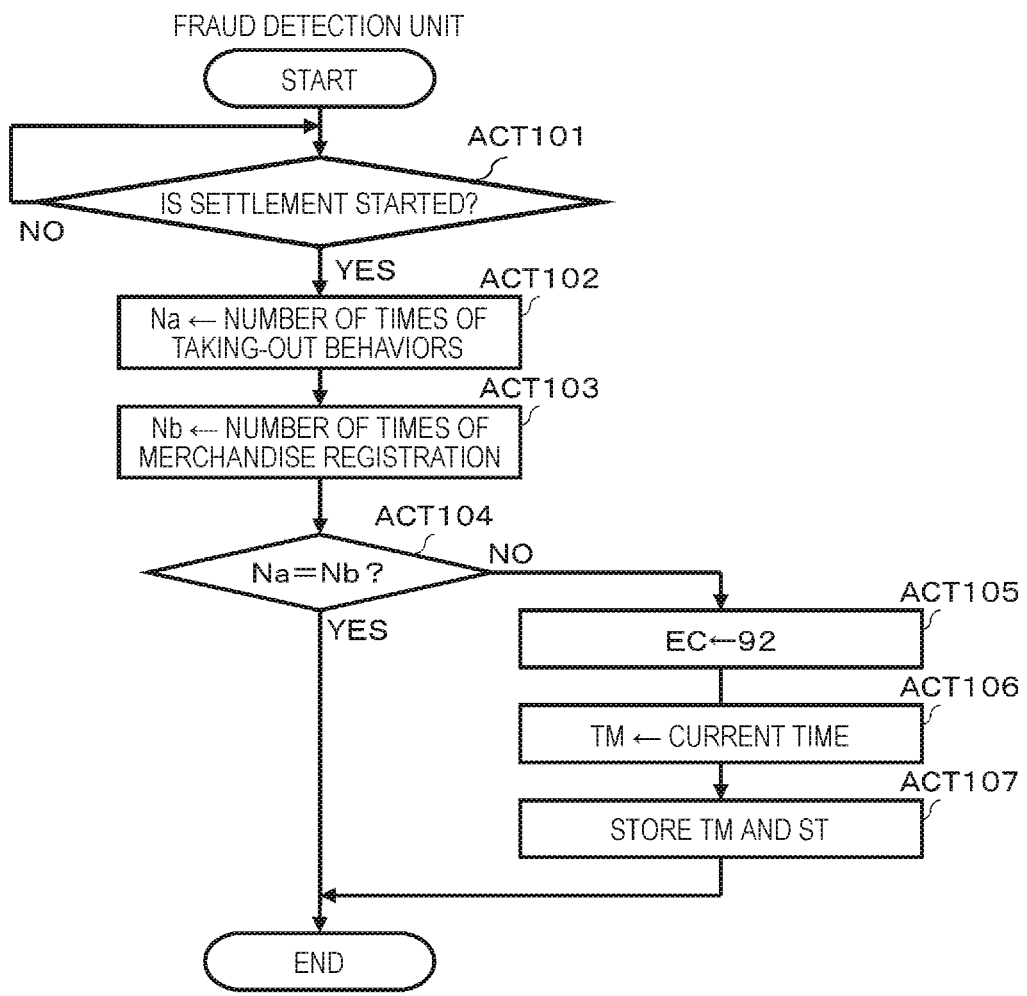
FIG. 13 and FIG. 14 are flowcharts of functions of a fraud detection unit according to another embodiment.
Figure 14:
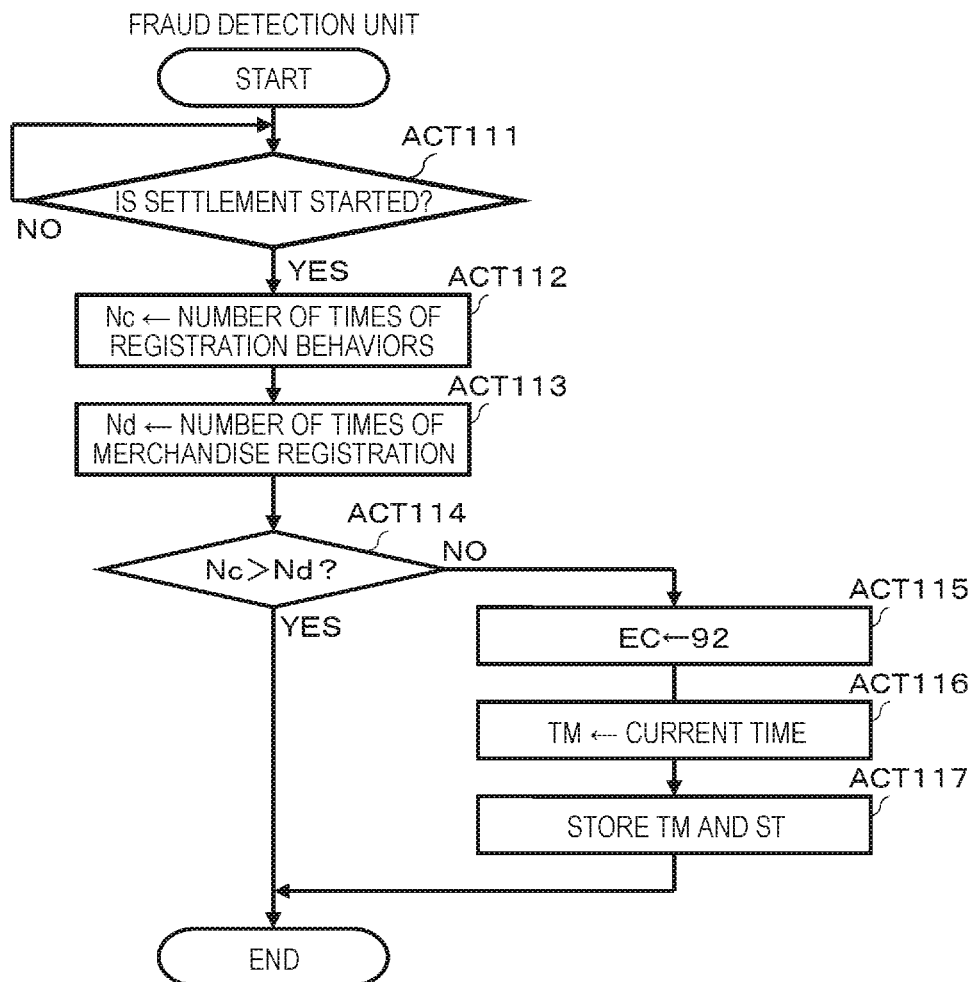

FIGS. 13 and 14 both are flowcharts of the functions of the fraud detection unit 223 that detects the fraud behavior "fake registration" from the number of times of the operations and the behavior of the customer.

In FIG. 13, the processor 81 waits for the recognition of the settlement start operation as ACT 101. If the settlement start operation is recognized by the function of the operation recognition unit 222, "24" is stored as the status ST in the time-series buffer 822. If it is confirmed that "24" is stored as the status ST in the time-series buffer 822, the processor 81 determines YES in ACT 101 and proceeds to ACT 102. The processor 81 searches for the time-series buffer 822 in which "24" is stored as the status ST in ACT 102. Then, the processor 81 calculates the number of the statuses ST of "11", that is, the number of times of taking-out behaviors Na. The processor 81 calculates the number of the statuses ST of "22", that is the number of times of merchandise registration Nb as ACT 103. Then, the processor 81 confirms whether the number of times of taking-out behaviors Na and the number of times of merchandise registration Nb are identical to each other in ACT 104.

When the customer correctly registers merchandise taken out by performing the taking-out behavior at the self-service POS terminal 11, the number of times of taking-out behaviors Na and the number of times of merchandise registration Nb are identical to each other. Therefore, when the number of times of taking-out behaviors Na and the number of times of merchandise registration Nb are identical to each other, the processor 81 determines YES in ACT 104 and ends the functions of the fraud detection unit 223.

In contrast, if the number of times of taking-out behaviors Na and the number of times of merchandise registration Nb are not identical to each other, it is considered that the fraud behavior "fake registration" has been performed. Therefore, if the number of times of taking-out behaviors Na and the number of times of merchandise registration Nb are not identical to each other, the processor 81 determines NO in ACT 104 and proceeds to ACT 105. The processor 81 sets the error code EC as "92" in ACT 105. The processor 81 obtains the current time TM tracked by the clock 84 in ACT 106. Then, the processor 81 stores the time TM and the error code EC in a correlating manner in the time-series buffer 822 to which "24" is stored as the status ST in ACT 107. In the above, the function as the fraud detection unit 223 ends.

In this manner, according to the embodiment illustrated in FIG. 13, if the number of times of taking-out behaviors Na and the number of times of merchandise registration Nb are not identical to each other, "92" is stored as the error code EC in the time-series buffer 822. Accordingly, the fraud behavior "fake registration" is notified by the function of the notification unit 224.

In FIG. 14, the processor 81 waits for the recognition of the settlement start operation in ACT 111. If it is confirmed that "24" is stored as the status ST in the time-series buffer 822, the processor 81 determines YES in ACT 111 and proceeds to ACT 112. The processor 81 searches for the time-series buffer 822 in which "24" is stored as the status ST in ACT 112. Then, the processor 81 calculates the number of the statuses ST of "12", that is, the number of times of registration behaviors Nc. The processor 81 calculates the number of the statuses ST of "22", that is, the number of times of merchandise registration Nd, in ACT 113. Then, the processor 81 confirms whether the number of times of registration behaviors Nc and the number of times of merchandise registration Nd are identical to each other in ACT 114.

If the customer correctly performs the registration behavior, the number of times of registration behaviors Nc and the number of times of merchandise registration Nd are identical to each other. Accordingly, if the number of times of registration behaviors Nc and the number of times of merchandise registration Nd are identical to each other, the processor 81 determines YES in ACT 114 and ends the function of the fraud detection unit 223.

In contrast, for example, if the customer performs the registration behavior without holding the barcode over the reading window 42, the number of times of registration behaviors Nc is smaller than the number of times of merchandise registration Nd. Accordingly, if the number of times of registration behaviors Nc becomes smaller than the number of times of merchandise registration Nd, the processor 81 determines NO in ACT 114 and proceeds to ACT 115. The processor 81 performs the same processes as ACTS 105 to 107 illustrated in FIG. 13 as ACTS 115 to 117. In the above, the function of the fraud detection unit 223 ends.

In this manner, according to the embodiment illustrated in FIG. 14, when the number of times of registration behaviors Nc is smaller than the number of times of merchandise registration Nd, "92" is stored as the error code EC in the time-series buffer 822. Accordingly, by the function of the notification unit 224, the fraud behavior "fake registration" is notified.

According to the above embodiments, a case where one camera 21 is disposed for one self-service POS terminal 11 is exemplified. The camera 21 may not be necessarily disposed for each self-service POS terminal 11. For example, if customers who operate two adjacent self-service POS terminals 11 can be photographed with one camera 21, the number of the cameras 21 may be reduced. However, in such a case, in ACT 2 of FIG. 7, the cashier number of the self-service POS terminal 11 the closest to the position of a person viewed in the video is obtained.

For example, the plurality of cameras 21 may be disposed for one self-service POS terminal 11. Accordingly, the blind spot of the self-service POS terminal 11 is reduced, so that fraud behaviors of customers can be detected more accurately.

In the above embodiments, a case where the notification unit 224 performs notification to the attendant via the attendant terminal 14 is exemplified. The notification destination is not limited to the attendant terminal 14. For example, the self-service POS terminal 11 on which the fraud behavior is performed may be set as the notification destination. In such a case, for example, the light emitting unit 65 emits light of a certain color, to notify a clerk of the fraud behavior being performed. Otherwise, by displaying a warning message on the touch panel 41, the detection of the fraud behavior is informed to the customer. Otherwise, by wireless communication with a communication terminal possessed by the clerk, by display or a voice, the warning of the fraud behavior may be generated.

In the above embodiments, the attendant terminal 14 may have the function of the display control device 13. In such a case, the operation recognition unit 222 obtains the data of the monitoring screen SC from the attendant terminal 14 and recognizes the operation of the customer to the self-service POS terminal 11. Otherwise, the operation recognition unit 222 may import a data signal output from each of the self-service POS terminals 11 from the communication network 15, for example, via a router, and recognize an operation of the customer on the self-service POS terminal 11 based on the data signals.

The fraud behavior recognition device 22 may include an additional storage device that continuously records the imaged data imported from each of the cameras 21. In this manner, when the fraud behavior of the customer is detected, the imaged data imported to the recording unit is reproduced to verify the fraud behavior.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A detection device for detecting fraudulent behaviors by a customer at a self-service point-of-sale (POS) terminal in a store and determining a message to be displayed on the self-service POS terminal by a display control device via a store network in the store, comprising:
   a camera interface circuit connectable to a camera installed in the store and configured to capture a first image of the customer operating the self-service POS terminal to perform checkout processing in a sales transaction;
   a network interface circuit connectable to the display control device via the store network and configured to receive a second image that is displayed on the self-service POS terminal from the display control device;
   a memory that stores a plurality of messages each corresponding to a fraudulent behavior; and
   a processor configured to:
      acquire one or more first images from the camera via the camera interface circuit and determine one or more behaviors of the customer based on the acquired first images,
      acquire one or more second images from the display control device via the network interface circuit and determine, based on the acquired second images, one or more operations that have been made by the customer on the self-service POS terminal,
      determine whether one of the behaviors of the customer is fraudulent based on one or more of the operations that have been made by the customer before said one of the behaviors, and
      upon determining that one of the behaviors of the customer is fraudulent, select one of the messages corresponding to said one of the behaviors, generate a notification command indicating the selected message, and control the network interface circuit to transmit to the display control device the notification command, in response to which the self-service POS terminal displays the selected message before completing the sales transaction.

2. The detection device according to claim 1, wherein said one of the behaviors is determined to be fraudulent when said one or more of the operations contradict said one of the behaviors.

3. The detection device according to claim 1, wherein the processor is further configured to:
   count a first number of predetermined behaviors of the customer,
   count a second number of predetermined operations corresponding to the predetermined behaviors, and
   determine that one of the predetermined behaviors is fraudulent when the first number is not identical with the second number.

4. The detection device according to claim 1, wherein
   the processor is further configured to determine a location of a component of the self-service POS terminal and a location of a body part of the customer in each of the first images, and
   the behaviors of the customer are determined based on the determined location of the component and the body part.

5. The detection device according to claim 1, wherein the processor is further configured to determine an operation that has been made by the customer based on a difference between two of the second images that have been sequentially received.

6. The detection device according to claim 1, wherein the processor is further configured to recognize a predetermined character string in the second images to determine said one or more operations.

7. The detection device according to claim 1, wherein
the camera interface circuit is further connectable to another camera installed in the store and configured to capture a third image of another customer operating another self-service POS terminal to perform checkout processing in another sales transaction,
the network interface circuit is further configured to receive a fourth image that is displayed on said another self-service POS terminal from the display control device via the store network, and
the processor is further configured to:
acquire one or more third images from said another camera via the camera interface circuit and determine one or more behaviors of said another customer based on the acquired third images,
acquire one or more fourth images from the display control device via the network interface circuit and determine, based on the acquired fourth images, one or more operations that have been made by said another customer on said another self-service POS terminal,
determine whether one of the behaviors of said another customer is fraudulent based on one or more of the operations that have been made by said another customer before said one of the behaviors, and
upon determining that one of the behaviors of said another customer is fraudulent, select one of the messages corresponding to said one of the behaviors of said another customer, generate another notification command indicating the selected message, and control the network interface circuit to transmit to the display control device said another notification command, in response to which said another self-service POS terminal displays the selected message before completing said another sales transaction.

8. The detection device according to claim 1, wherein the notification command further causes an external terminal connected to the store network and operated by a store clerk to display the selected message.

9. A method performed by a detection device for detecting fraudulent behaviors by a customer at a self-service point-of-sale (POS) terminal in a store and determining a message to be displayed on the self-service POS terminal by a display control device via a store network in the store, the method comprising:
storing in a memory a plurality of messages each corresponding to a fraudulent behavior;
acquiring one or more first images of the customer operating the self-service POS terminal to perform checkout processing in a sales transaction from a camera and determining one or more behaviors of the customer based on the acquired first images;
acquiring one or more second images that are displayed on the self-service POS terminal from the display control device via the store network and determining, based on the acquired second images, one or more operations that have been made by the customer on the self-service POS terminal;
determining whether one of the behaviors of the customer is fraudulent based on one or more of the operations that have been made by the customer before said one of the behaviors; and
upon determining that one of the behaviors of the customer is fraudulent, selecting one of the messages corresponding to said one of the behaviors, generating a notification command indicating the selected message, and transmitting to the display control device the notification command, in response to which the self-service POS terminal displays the selected message before completing the sales transaction.

10. The method according to claim 9, wherein said one of the behaviors is determined to be fraudulent when said one or more of the operations contradict said one of the behaviors.

11. The method according to claim 9, further comprising:
counting a first number of predetermined behaviors of the customer;
counting a second number of predetermined operations corresponding to the predetermined behaviors; and
determining that one of the predetermined behaviors is fraudulent when the first number is not identical with the second number.

12. The method according to claim 9, further comprising:
determining a location of a component of the self-service POS terminal and a location of a body part of the customer in each of the first images, wherein
the behaviors of the customer are determined based on the determined location of the component and the body part.

13. The method according to claim 9, wherein one of the operations that have been made by the customer is determined based on a difference between two of the second images that have been sequentially acquired.

14. The method according to claim 9, further comprising:
recognizing a predetermined character string in the second images to determine said one or more operations.

15. The method according to claim 9, further comprising:
acquiring one or more third images of another customer operating another self-service POS terminal to perform checkout processing in another sales transaction from another camera and determining one or more behaviors of said another customer based on the acquired third images;
acquiring one or more fourth images that are displayed on said another POS terminal from the display control device via the store network and determining, based on the acquired fourth images, one or more operations that have been made by said customer using said another self-service POS terminal;
determining whether one of the behaviors of said another customer is fraudulent based on one or more of the operations that have been made by said another customer before said one of the behaviors; and
upon determining that one of the behaviors of said another customer is fraudulent, selecting one of the messages corresponding to said one of the behaviors of said another customer, generating another notification command indicating the selected message, and transmitting to the display control device said another notification command, in response to which said another self-service POS terminal displays the selected message before completing said another sales transaction.

16. A self-service point-of-sale (POS) system for managing sales transactions in a store, comprising:

a self-service POS terminal configured to perform checkout processing in a sales transaction in the store;
a camera configured to capture a first image of a customer operating the self-service POS terminal;
a display control device configured to manage a second image displayed on the self-service POS terminal via a store network in the store; and
a detection device connected to the display control device via the store network and configured to:
  store a plurality of messages each corresponding to a fraudulent behavior,
  acquire one or more first images from the camera and determine one or more behaviors of the customer based on the acquired first images,
  acquire one or more second images from the display control device via the store network and determine, based on the acquired second images, one or more operations that have been made by the customer using the self-service POS terminal,
  determine whether one of the behaviors of the customer is fraudulent based on one or more of the operations that have been made by the customer before said one of the behaviors, and
  upon determining that one of the behaviors is fraudulent, select one of the messages corresponding to said one of the behaviors, generate a notification command indicating the selected message, and transmit the notification command to the display control device, wherein
the display control device is configured to, upon receipt of the notification command from the detection device, control the self-service POS terminal to display the selected message before completing the sales transaction.

* * * * *